US008287256B2

(12) United States Patent
Shafer et al.

(10) Patent No.: US 8,287,256 B2

(45) Date of Patent: Oct. 16, 2012

(54) VALVE ASSEMBLY

(75) Inventors: Scott F. Shafer, Morton, IL (US); Christopher R. Jones, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1384 days.

(21) Appl. No.: 11/981,876

(22) Filed: Nov. 1, 2007

(65) Prior Publication Data

US 2009/0114292 A1 May 7, 2009

(51) Int. Cl.

*F04B 7/00* (2006.01)
*F04B 39/08* (2006.01)
*F16K 31/02* (2006.01)

(52) U.S. Cl. .................................... 417/505; 251/129.15

(58) Field of Classification Search ............. 251/129.15; 417/298, 505; 123/446–447, 500–501, 506

See application file for complete search history.

(56) References Cited

U.S. PATENT DOCUMENTS

| | | | | |
|---|---|---|---|---|
| 3,753,426 | A | 8/1973 | Lilley | |
| 3,918,681 | A | 11/1975 | Eberhardt | |
| 4,180,097 | A | 12/1979 | Sjoberg | |
| 4,540,154 | A | 9/1985 | Kolchinsky et al. | |
| 4,662,392 | A | 5/1987 | Vadasz | |
| 4,936,339 | A | 6/1990 | Bennett | |
| 5,052,435 | A | 10/1991 | Crudup et al. | |
| 5,058,553 | A | 10/1991 | Kondo et al. | |
| 5,094,216 | A | 3/1992 | Miyaki et al. | |
| 5,147,189 | A | 9/1992 | Barnowski | |
| 5,197,438 | A | 3/1993 | Yamamoto | |
| 5,249,600 | A | 10/1993 | Blume | |
| 5,257,918 | A | 11/1993 | Kraemer | |
| 5,297,580 | A | 3/1994 | Thurman | |
| 6,019,125 | A | 2/2000 | Reverberi | |
| 6,279,844 | B1 * | 8/2001 | Shen et al. | 239/585.4 |
| 6,302,136 | B1 | 10/2001 | Weaver et al. | |
| 6,332,761 | B1 | 12/2001 | Guentert et al. | |
| 6,386,221 | B1 | 5/2002 | Knoll et al. | |
| 6,457,957 | B1 | 10/2002 | Bauer et al. | |
| 6,519,847 | B1 * | 2/2003 | Trudeau et al. | 29/888.44 |
| 6,918,409 | B1 | 7/2005 | Parker | |
| 2003/0177752 | A1 * | 9/2003 | Nakagawa et al. | 59/5 |
| 2005/0189509 | A1 * | 9/2005 | Peric | 251/129.15 |
| 2005/0211224 | A1 * | 9/2005 | Inaguma et al. | 123/458 |

FOREIGN PATENT DOCUMENTS

GB 2169687 7/1986

* cited by examiner

*Primary Examiner* — Devon Kramer
*Assistant Examiner* — Philip Stimpert
(74) *Attorney, Agent, or Firm* — Miller, Matthias & Hull

(57) ABSTRACT

Although modern diesel fuel formulations are intended to reduce emissions of diesel engines, at least some of those modern fuels tend to have relatively low lubricity levels. The control valve assemblies described herein help to minimize any increased wear that would otherwise result from the use of such low lubricity fuels by providing a valve element, a valve guide, and an insert. The valve element is received within the valve guide and is moveable between an open position and a closed position. The insert forms a first sealed interface and a second sealed interface with the valve element and the valve guide. When the valve element is in the closed position, both of the first sealed interface and the second sealed interface are engaged. When the valve element is in the open position, only one of the first sealed interface and the second sealed interface is engaged.

16 Claims, 4 Drawing Sheets

VALVE ASSEMBLY

TECHNICAL FIELD

The present disclosure relates to high-pressure pumps. More particularly, the present disclosure relates to valve assemblies for use in high-pressure pumps.

BACKGROUND

Emissions regulations in the United States, Europe, Japan, China and other countries are becoming increasingly stringent in terms of the emissions levels that are permitted for diesel engines. For example, the U.S. regulations limit, among other things, the levels of particular matter and oxides of nitrogen (commonly referred to a NOx) that may be emitted from a diesel engine. In addition to the regulations governing diesel engine emissions, the U.S. government has also promulgated regulations requiring the sulfur content of highway diesel fuel to be below a certain level (e.g., 15 ppm). This too has been done in an effort to facilitate the reduction of the particulate matter emitted by diesel engines.

Although reducing the sulfur content of diesel fuel helps to reduce undesirable emissions, this often has the effect of reducing the lubrication levels of the fuel. The processing steps that are used to produce the standard U.S. low sulfur diesel fuel, or ultra low sulfur diesel fuel as it is often called, generally result in a reduction in the average normal carbon chain length, which also tends to reduce the lubrication levels of the fuel. Fuel blenders sometimes compensate for the reduced lubricity, at least in part, through the use of additive packages, but this generally does not result in the desired lubrication levels. Other specialty fuels, such as Toyu and JP8, also feature shorter than average normal carbon chain lengths and lower sulfur than traditional U.S. 2D diesel fuel, and therefore also possess relatively low lubrication levels.

One area in which the reduced lubricity of diesel fuel has a significant impact is the fuel system of diesel engines, particularly the pumps and injectors of the fuel system. Pumps and injectors include key parts that move or reciprocate relative to other parts millions of times during the life of an engine. When the fuel serves as a lubricant to these parts, which is often the case, a reduction in the lubricity of the fuel can significantly increase the rate of wear in these parts, which in turn leads to earlier failure of the parts and/or the entire fuel system. For example, conventional inline plunger or piston fuel pumps that are used to generate the high fuel pressure in common rail fuel systems may include control valve assemblies that actuate millions of times during the life of the pump. Although these control valve assemblies may experience little wear over time when used with pump traditional 2D diesel fuel, their use with newer diesel fuel formulations that have reduced lubricity may cause these control valve assemblies to prematurely fail due to the increase in wear experienced by the control valve assemblies when used with these newer fuels.

Although certain materials may be selected that would exhibit a resistance to wear in the presence of a fluid with low lubricity levels, the use of these materials in a fuel systems application is often very difficult. For example, a ceramic material may provide acceptable resistance to wear in the presence of a fuel with low lubrication levels. However, the incorporation of a ceramic material into a fuel system is made difficult due to the fact that ceramics tend to be very hard, making the manufacture of ceramic parts more difficult, they tend to be expensive, making extensive use of the material cost prohibitive, and their brittle nature makes them susceptible to failure when subjected to tensile stresses, which are difficult to avoid in fuel systems applications. Also making the selection of an appropriate material difficult is the corrosive nature of many diesel fuels. Materials that would otherwise possess favorable characteristics may not be suitable for use in a fuel system because of their susceptibility to corrosive attack by the diesel fuel.

Various efforts have been made to address wear issues in high-pressure pumps. One example of such an effort is described in U.S. Pat. No. 6,019,125, issued Feb. 1, 2000 ("the '125 patent"). The '125 patent discloses a valve that fits within a cylindrical cavity formed in the pump body and that is retained in position by an overlying retention plug. The valve includes a cage-shaped valve body that includes an upper part and a lower part. The upper part includes four ribs, while the lower part includes a valve seat. The valve also includes a valving element located within the valve body that is guided by the four ribs and that is maintained in the closure position by a spring. Although the valve disclosed in the '125 patent appears to have been designed with wear in mind, it appears to have been designed not to minimize wear but rather to be easily replaceable after excessive wear occurs. Moreover, the '125 patent fails to appreciate the different wear characteristics that may result from the use of different fuel compositions, such as the different wear characteristics that may result from the use of traditional U.S. 2D diesel fuel versus the new U.S. ultra low sulfur diesel fuel.

It would be advantageous to provide a relatively simple, reliable, durable, and inexpensive control valve assembly that could effectively operate in a fuel system in which low lubricity diesel fuels are used.

SUMMARY

According to one exemplary embodiment, a control valve assembly for a high-pressure pump comprises an actuator, a valve element, a valve guide, and an insert. The actuator is moveable in response to an input signal. The valve element is coupled to the actuator and is moveable between an open position and a closed position. The valve element includes a body and a head. The body includes a first guide surface and the head includes a first sealing surface. The valve guide includes a guide bore, an end, and a flow passage between the guide bore and the end. The guide bore receives the body of the valve element, the end includes a second sealing surface, and the flow passage is configured to allow fluid to flow through the valve guide. The insert is coupled to one of the valve member and the valve body and includes a third sealing surface and a fourth sealing surface. The third sealing surface cooperates with the first sealing surface of the valve element to form a first sealed interface. The fourth sealing surface cooperates with the second sealing surface of the valve guide to form a second sealed interface. The movement of the actuator causes the valve element to move between the closed position, in which both of the first sealed interface and the second sealed interface are engaged, and the open position, in which one of the first sealed interface and the second sealed interface is engaged and the other one of the first sealed interface and the second sealed interface is disengaged.

According to another exemplary embodiment, a method of selectively coupling a pumping chamber with a fluid source comprises the step of providing a flow chamber between a valve guide and a valve element. The flow chamber is fluidly coupled to the fluid source and the valve element is selectively moveable relative to the valve guide. The method also comprises the steps of selectively moving the valve element toward the valve guide to a closed position in which the flow chamber is fluidly disconnected with the pumping chamber and selectively moving the valve element toward the pumping chamber to an open position in which the flow chamber is fluidly coupled to the pumping chamber. The method also comprises the step of sealing the flow chamber by compressing an insert between the valve guide and the valve element when the valve element is in the closed position.

DETAILED DESCRIPTION

Figure 1:
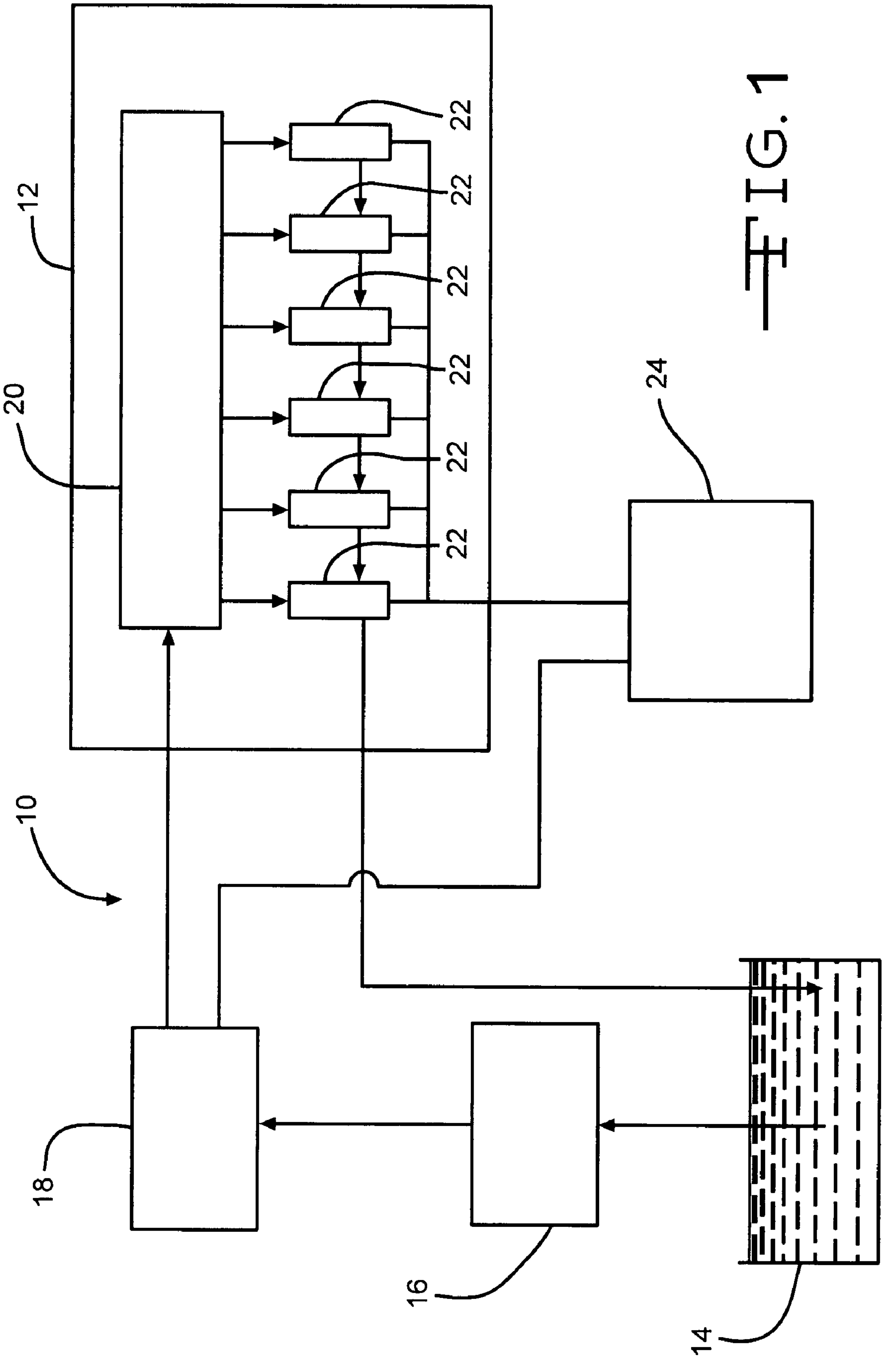
FIG. 1 is a schematic illustration of a fuel system according to one exemplary embodiment.

Referring generally to FIG. 1, a fuel system 10 is shown according to one exemplary embodiment. Fuel system 10 is the system of components that cooperate to deliver fuel (e.g., diesel, gasoline, heavy fuel, etc.) from a location where fuel is stored to the combustion chamber(s) of an engine 12 where it will combust and where the energy released by the combustion process will be captured by engine 12 and used to generate a mechanical source of power. Although depicted in FIG. 1 as a fuel system for a diesel engine, fuel system 10 may be the fuel system of any type of engine (e.g., internal combustion engine such as a diesel or gasoline engine, a turbine, etc.). According to one exemplary embodiment, fuel system 10 includes a tank 14, a transfer pump 16, a high-pressure pump 18, a common rail 20, fuel injectors 22, and an electronic control module (ECM) 24.

Tank 14 is a storage container that stores the fuel that fuel system 10 will deliver. Transfer pump 16 pumps fuel from tank 14 and delivers it at a generally low pressure to high-pressure pump 18. High-pressure pump 18, in turn, pressurizes the fuel to a high pressure and delivers the fuel to common rail 20. Common rail 20, which is intended to be maintained at the high pressure generated by high-pressure pump 18, serves as the source of high-pressure fuel for each of fuel injectors 22. Fuel injectors 22 are located within engine 12 in a position that enables fuel injectors 22 to inject high-pressure fuel into the combustion chambers of engine 12 (or pre-chamber or ports upstream of the combustion chamber in some cases) and generally serve as metering devices that control when fuel is injected into the combustion chamber, how much fuel is injected, and the manner in which the fuel is injected (e.g., the angle of the injected fuel, the spray pattern, etc.). Each fuel injector 22 is continuously fed fuel from common rail 20 such that any fuel injected by a fuel injector 22 is quickly replaced by additional fuel supplied by common rail 20. ECM 24 is a control module that receives multiple input signals from sensors associated with various systems of engine 12 (including fuel system 10) and indicative of the operating conditions of those various systems (e.g., common rail fuel pressure, fuel temperature, throttle position, engine speed, etc.). ECM 24 uses those inputs to control, among other engine components, the operation of high-pressure pump 18 and each of fuel injectors 22. The purpose of fuel system 10 is to ensure that the fuel is constantly being fed to engine 12 in the appropriate amounts, at the right times, and in the right manner to support the operation of engine 12.

Figure 2:
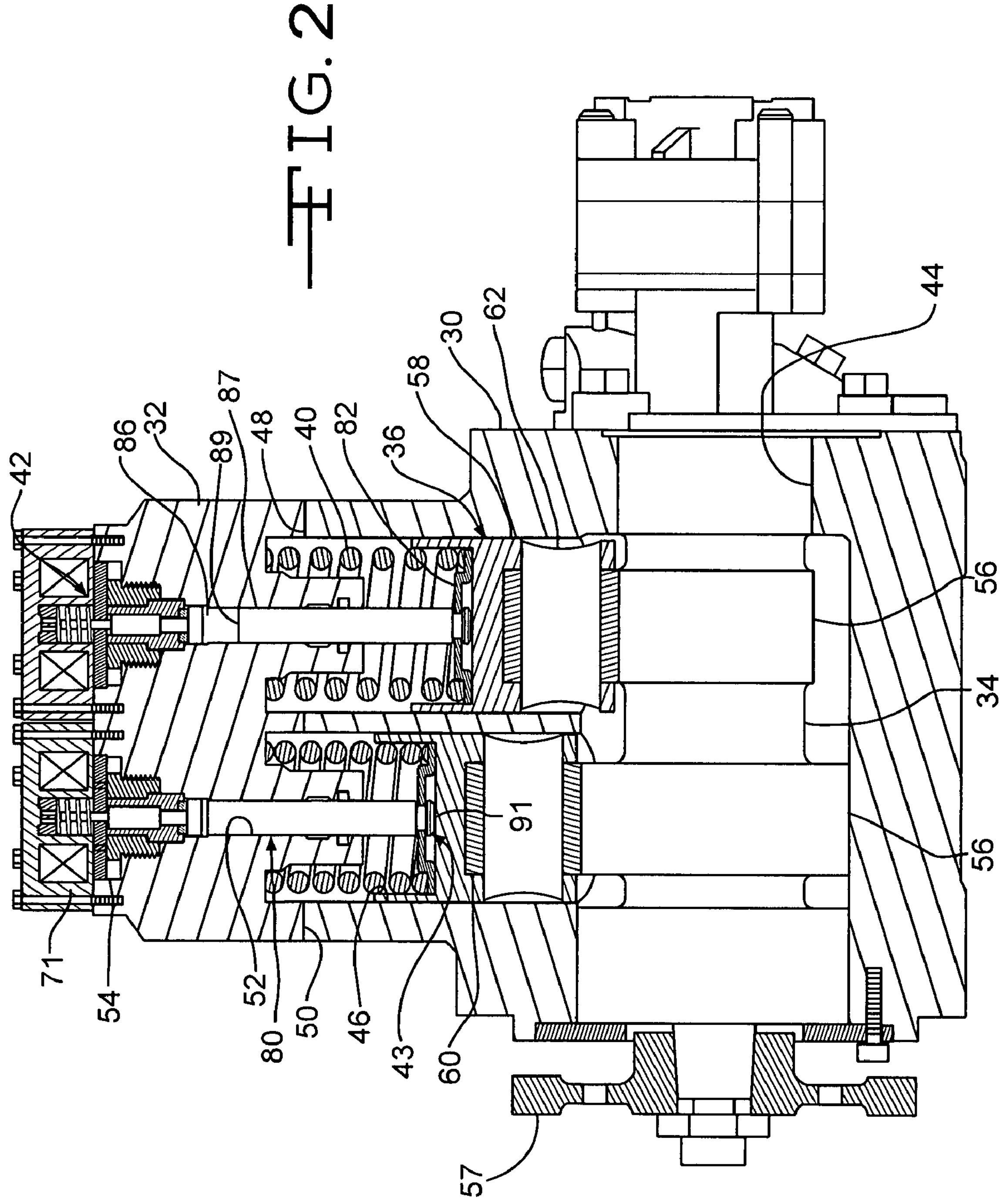
FIG. 2 is a cross-sectional side view of a pump including a control valve assembly according to one exemplary embodiment.

Referring now to FIG. 2, high-pressure pump 18 is configured to increase the pressure of the fuel from a pressure that is sufficient to transfer the fuel from the tank to a pressure that is desirable for the injection of the fuel into the combustion chambers of engine 12 (or injection elsewhere). Such injection pressures may vary between different applications, but often range between approximately 1500 bar and 2000 bar, and may include pressures that are below 1500 bar or above 2000 bar. According to one exemplary embodiment, pump 18 includes a housing 30, a head 32, a camshaft 34, two tappet assemblies 36, two resilient members 40, two plunger assemblies 43, and two control valve assemblies 42.

Housing 30 is a rigid structure that generally serves as the base of pump 18. Housing 30 includes a central bore 44 that is configured to receive camshaft 34, as well as two spaced-apart, parallel tappet bores 46 that are each configured to receive at least a portion of a tappet assembly 36, a plunger assembly 43, a resilient member 40, and head 32. The axis of each tappet bore 46 is arranged perpendicularly (or radially) to the axis of central bore 44 such that the rotation of camshaft 34 within central bore 44 causes tappet assemblies 36 to translate in a linear, reciprocating manner within tappet bores 46. Near the distal ends of tappet bores 46, housing 30 also includes a face 48 that is configured to receive head 32.

Figure 3:
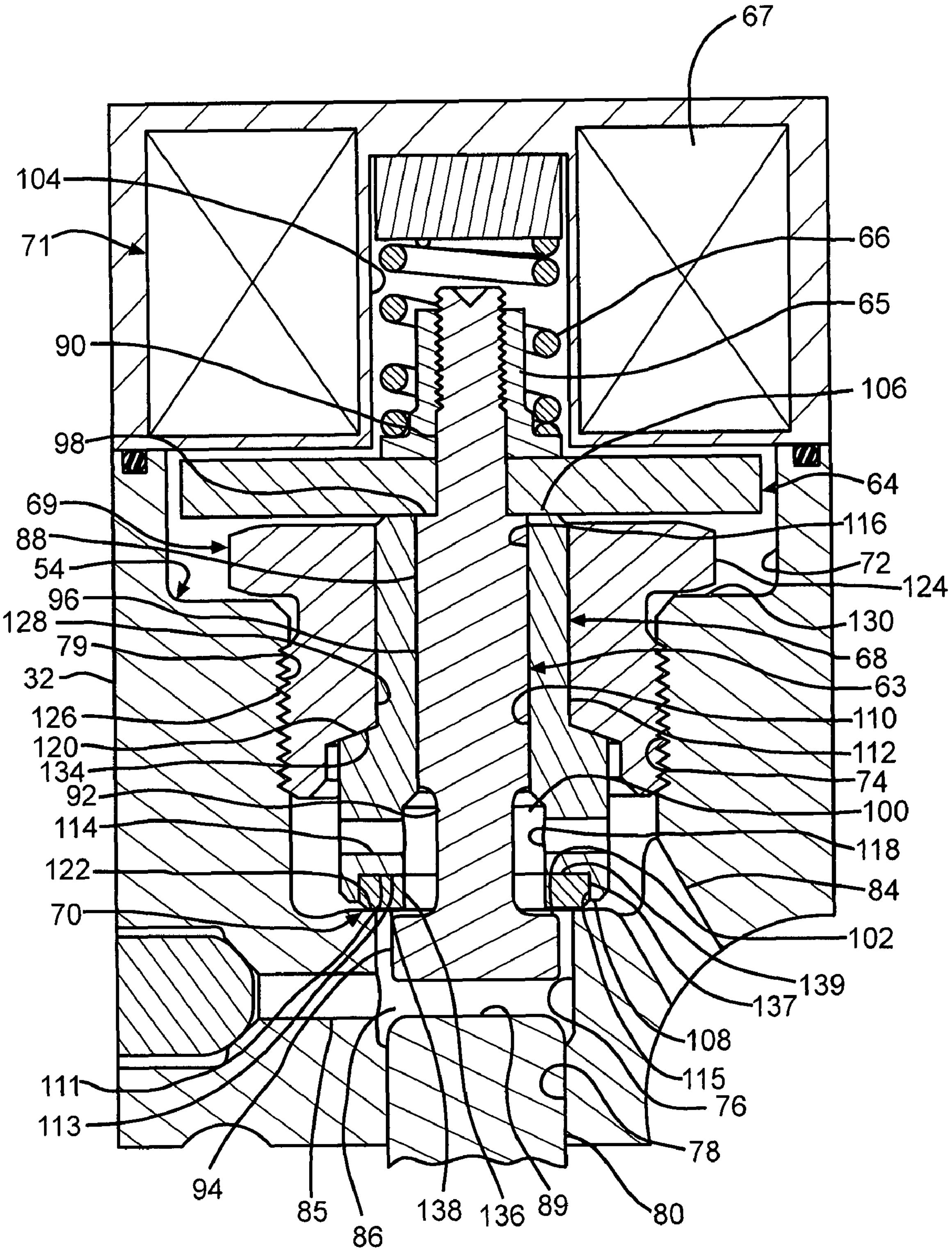
FIG. 3 is a cross-sectional side view of the control valve assembly of FIG. 2 illustrating an insert coupled to a valve element of the control valve assembly.

Head 32 is coupled to face 48 of housing 30 and generally serves, among other things, to enclose tappet bores 46, provide a portion of the structure defining pumping chambers 86 (discussed below), receive control valve assemblies 42, and provide various ports and ducts to direct the flow of fuel into and out of pumping chambers 86. Head 32 includes a face 50 that cooperates with face 48 of housing 30 (and a sealing element such as an o-ring) to provide a sealed interface between head 32 and housing 30. As illustrated in FIG. 3, head 32 also includes two apertures 54, each of which is configured to receive a portion of control valve assembly 42 and a portion of plunger assembly 43. Each aperture 54 includes four regions, region 72, region 74, region 76, and region 88, which have progressively smaller diameters as the aperture extends into head 32. Regions 72, 74, and 76 are configured to receive portions of control valve assembly 42, while region 78 is configured to receive a portion of plunger assembly 43. Region 74 includes an engagement structure 79 shown as threads that are configured to engage a corresponding engagement structure of a portion of control valve assembly 42.

Camshaft 34 is a driven member that is formed from an elongated shaft that includes two sets of cam lobes 56 that are spaced apart along the length of camshaft 34 and a gear or pulley 57 on one of its two ends. Gear or pulley 57 is a driven member that is configured to engage another member, such as another gear, a chain, or a belt, that is driven, either directly or indirectly, by engine 12. The two sets of cam lobes 56 are spaced apart along the length of camshaft 34 so as to correspond with each of the two tappet assemblies 36. According to various exemplary and alternative embodiments, each set of cam lobes 56 may include a single cam lobe, two cam lobes, three cam lobes, or more than three cam lobes, with each cam lobe representing a complete pumping and filling cycle. According to other various alternative and exemplary embodiments, the two sets of cam lobes may be in phase with one another (such that the cam lobes of the first cam lobe set will pass under head 32 at the same time as the corresponding cam lobes of the second cam lobe set) or they may be out of phase with one another (such that the cam lobes of the first cam lobe set will pass under head 32 at different times than the corresponding cam lobes of the second cam lobe set). According to other various alternative and exemplary embodiments, the extent to which the cam lobes of the first cam lobe set may be out of phase relative to the cam lobes of the second cam lobe set may vary depending on the application of pump 18 and other factors.

Referring still to FIG. 2, each tappet assembly 36 (also sometimes referred to as a lifter assembly) is configured to engage one of the two sets of cam lobes 56, transform the rotational movement of the corresponding cam lobes 56 into linear movement, and transfer such linear movement to the corresponding plunger assembly 43. Each tappet assembly 36 includes a body 58 that engages and receives a portion of plunger assembly 43, a roller 60 that engages and follows a set of cam lobes 56, and a pin 62 that couples roller 60 to body 58. Body 58 is received within the corresponding tappet bore 46 of housing 30 and translates back and forth within tappet bore 46 as camshaft 34 rotates.

Resilient member 40, shown as a compression spring, is an element or member that serves to bias the corresponding plunger assembly 43 and tappet assembly 36 toward camshaft 34. By biasing both the corresponding plunger assembly 43 and tappet assembly 36 toward camshaft 34, resilient member 40 helps to ensure that plunger assembly 43 returns to its lowest position (hereinafter referred to as "bottom dead center") before camshaft 34 completes another rotation (or partial rotation, depending on the cam lobe configuration) and forces plunger assembly 43 back up to its highest position (hereinafter referred to as "top dead center"). This helps to ensure that plunger assembly 43 is performing a complete filling cycle (the cycle where plunger assembly 43 moves from top dead center to bottom dead center) and a complete pumping cycle (the cycle where plunger assembly 43 moves from bottom dead center to top dead center) for each cam lobe 56 in the corresponding cam lobe set of camshaft 34.

Plunger assembly 43 is an assembly of components that is located generally between the corresponding tappet assembly 36 and head 32 and that reciprocate with tappet assembly 36 relative to head 32 to pressurize the fluid within pumping chamber 86. According to one exemplary embodiment, plunger assembly 43 includes a plunger 80 and a retainer 82. Plunger 80 is a member (e.g., piston, shaft, rod, element, retained member) that is configured to reciprocate or slide within region 78 of aperture 54 of head 32 as the corresponding tappet assembly 36 reciprocates within tappet bore 46 of housing 30. According to one exemplary embodiment, plunger 80 includes an elongated, generally cylindrical body 83 having a side wall 87, a first end 89 that is configured to extend into region 78 of aperture 54, and a second end 91 located near tappet assembly 36. First end 89, region 78 of aperture 54, and a portion of control valve assembly 42 define pumping chamber 86, the volume of which changes as plunger 80 moves back and forth, or up and down, within region 78 of aperture 54. Retainer 82 is a component or an assembly of components that couple to plunger 80 and that serve to apply at least a portion of the force provided by resilient member 40 to plunger 80. Retainer 82 is an element or assembly of elements that serves to receive resilient element 40 (e.g., spring) and ultimately transfer the force provided by resilient element 40 to plunger 80.

Referring now to FIGS. 2 and 3, each control valve assembly 42 generally serves to control the fluid communication between pumping chamber 86 (discussed below) and the fuel being provided by transfer pump 16, and therefore is capable of controlling the amount of fuel that enters pumping chamber 86 during the filling cycle and the amount of fuel that remains in pumping chamber 86 during the pumping cycle. According to a first exemplary embodiment, control valve assembly 42 includes a valve element 63, an actuator 71, a valve guide 68, a connector 69, and an insert 70.

Valve element 63 is moveable between on open position in which a fuel inlet passage 84 is fluidly connected to pumping chamber 86 and a closed position in which fuel inlet passage 84 is not fluidly connected to, or is sealed off from, pumping chamber 86. According to one exemplary embodiment, valve element 63 extends through regions 72, 74, and 76 of aperture 54 and includes a body 88, an armature interface 90, a stem 92, and a head 94. Body 88 is a generally cylindrical portion of valve element 63 and defines a guide surface 96 that cooperates with valve guide 68 to guide the movement of valve element 63 relative to valve guide 68. Armature interface 90 extends from one end of body 88 and receives a portion of actuator 71 (e.g., armature 64 and sleeve 75, described below). Armature interface 90 may be threaded to facilitate the coupling of armature 64 and/or or sleeve 65 to valve element 63, or armature interface 90 may be configured in any one of a variety of different ways to facilitate the engagement of armature 64 and sleeve 65 with valve element 63. For example armature interface 90 may be configured so that either or both of armature 64 and sleeve 65 freely slide over armature interface 90, may be press fit onto armature interface 90, or engage armature interface 90 in any one of a variety of other ways. A shoulder 98 is formed where armature interface 90 extends from body 88 and serves to provide a positive stop for armature 64 and to help align armature 64. Stem 92 extends from the opposite end of body 88 and has a diameter that is less than that of body 88. The reduced diameter of stem 92, in combination with a portion of valve guide 68, insert 70, and head 94, defines a chamber 100 (e.g., a flow chamber) that enables fluid to flow between valve element 63 and valve guide 68 when valve element 63 is in the open position. Head 94 is coupled to the distal end of stem 92 and forms a cap-like structure having a diameter that is larger than the diameter of stem 92 and body 88. Head 94 includes a sealing surface 102 that extends perpendicularly and radially outward from the distal end of stem 92 and that is configured to engage a corresponding sealing surface on insert 70 when valve element 63 is in the closed position to substantially seal off pumping chamber 86 from inlet passage 84. According to various alternative and exemplary embodiments, valve element 63 may take one of a variety of different configurations. For example, the relative sizes of the different portions of valve element 63 may vary depending on the application (e.g., the diameter of the head may be the same size as or smaller than the diameter of the body, the diameter of the stem may be the same size as the diameter of the body, etc.), the orientation of the sealing surface may vary (e.g., it may be substantially perpendicular to a longitudinal axis of the valve element, or it may be oriented at an acute or obtuse angle relative to the longitudinal axis), and/or the shape or configuration of the sealing surface may vary (e.g., it may be flat, it may form a knife edge, it may be curved, it may have one or more flat, curved, and/or pointed portions, etc.).

Actuator 71 is an electronically controlled device that generates movement in response to an electric signal. Within control valve assembly 42, actuator 71 serves to move valve element 63 relative to valve guide 68. According to one exemplary embodiment, actuator 71 includes an armature 64, a sleeve 65, a biasing member 66, and a solenoid 67. Armature 64 is a disk-like element that includes an aperture that receives armature interface 90 of valve element 63. A sleeve or retainer shown as sleeve 65 may be provided to secure armature 64 to valve element 63. For example, sleeve 65 may include a threaded interface that engages a threaded interface provided on armature interface 90 of valve element 63. Armature 64 may then be secured to valve element 63 by tightening sleeve 65 onto armature interface 90 and forcing armature 64 against shoulder 98 of valve element 63. Solenoid 67 is coupled to the top of head 32 such that a portion of valve element 63 extends through an aperture 104 extending at least partially through solenoid 67. Biasing member 66, shown as a compression spring, is located within aperture 104 and receives a portion of valve element 63 and sleeve 65. In addition to helping to secure armature 64 to valve element 63, sleeve 65 may also facilitate the application of force by the spring 66 to armature 64 and valve element 63.

According to one exemplary embodiment, solenoid 67 is a device that includes a coil of wires wrapped around a core that together create a magnetic field when an electrical current is passed through the wires. Solenoid 67 is configured so that armature 64 is drawn toward solenoid 67 when the magnetic field is created. Solenoid 67 and armature 64 may be configured so that there is relatively little or no attraction of armature 64 to solenoid 67 when no electrical current is being passed through solenoid 67. Spring 66 helps to ensure that armature 64 returns to a position away from solenoid 67 when the flow of current through solenoid 67 is terminated. Spring 66 is configured to provide a biasing force that is sufficient to force armature 64 away from solenoid 67 when solenoid 67 is deactivated but which may be overcome when solenoid 67 is activated. Because armature 64 is coupled to valve element 63, the movement of armature 64 is transferred to valve element 63. Thus, when solenoid 67 is activated, armature 64 moves toward solenoid 67 causing valve element 63 to move to the closed position. When solenoid 67 is deactivated, armature 64 is pushed away from solenoid 67 by spring 66 causing valve element 63 to move to the open position. According to an alternative embodiment, the solenoid, armature, and spring may be arranged so that activation of the solenoid moves the valve element to the open position while deactivation of the solenoid allows the spring to move the valve element to the closed position. According to other alternative and exemplary embodiments, the actuator may be replaced by any suitable actuation device that controls the movement of the valve element relative to the valve guide. For example, another actuation device or configuration that may be used may include a piezo controlled actuation system, a hydraulically controlled actuation system, or any other suitable actuation system.

Valve guide 68 is an element or member that forms the structure within which valve element 63 slides and is guided and with which valve element 63 engages to seal pumping chamber 86 from inlet passage 84. According to one exemplary embodiment, valve guide 68 includes a first end 106 located proximate armature 64, a second opposite end 108 located proximate head 94 of valve element 63, an aperture 110 extending longitudinally through valve guide 68, a recess 111 in end 108, a recess 112 around the outer periphery of valve guide 68, and flow passages 114. Aperture 110 extends between first end 106 and second end 108 and includes a first region 116 that is configured to closely receive body 88 of valve element 63 and a second region 118 that defines, in combination with stem 92, insert 70, and head 94 of valve element 63, chamber 100. First region 116 is intended to serve as a guide within which guide surface 96 of valve element 63 may slide. To minimize any fluid leakage that may occur between the surface defining first region 116 and body 88, the gap between them may be minimized. Second region 118 has a diameter larger than that of first region to help form chamber 100. In order to allow fluid to pass from inlet passage 84 into chamber 100, from which it will then be able to enter pumping chamber 86, flow passages 114 are provided through the portion of valve guide 68 defining second region 118. Recess 111, which is configured to receive insert 70, is provided in end 108 and is defined by a generally radial surface 113 and by a generally axial surface 115. Recess 112 is provided around the outer periphery of approximately the top half of valve guide 68 and is configured to receive connector 69. Recess 112 forms a radially outwardly extending shoulder 120 that is engaged by a portion of connector 69 to enable connector 69 to apply a force to valve guide 68 that urges valve guide 68 toward a sealing surface 122 within head 32 that is located between regions 74 and 76 of aperture 54. According to various alternative and exemplary embodiments, the valve guide may take one of a variety of different shapes and configurations. For example, according to one alternative embodiment, the diameter of the second region of the aperture may be the same as, or smaller than, the diameter of the first region. According to another alternative embodiment, the second end of the valve guide may include a structure different than, or in addition to, a recess in order to receive the insert.

Connector 69 (e.g., nut, plug, fastener, stopper, retainer, etc.) is a structure that serves to couple valve guide 68 to head 32, to align or properly position valve guide 68 within aperture 54 of head 32, and to apply a force to valve guide 68 sufficient to create a seal between valve guide 68 and sealing surface 122 of head 32 (either directly or indirectly). According to one exemplary embodiment, connector 69 includes a head 124, an engagement structure 126, and an aperture 128 that extends longitudinally through connector 69. Head 124 is a radially enlarged portion of connector 69 that is shaped (e.g., hex shaped) to facilitate the application of a torque to connector 69. The radial enlargement of connector 69 may also serve as a positive stop that limits the extent to which connector 69 may be threaded into region 74 of aperture 54 by engaging a surface 130 on head 32 located between regions 72 and 74 of aperture 54. Engagement structure 126, shown as threads, is configured to engage the corresponding engagement structure 79 provided on head 32 to allow connector 69 to be securely coupled to head 32 and to allow connector 69 to provide an adequate force to valve guide 68 to create a seal between end 108 of valve guide 68, insert 70, and surface 122 of head 32. Aperture 128 defines a region 132 that slides over or receives the portion of valve guide 68 defined by recess 112. Aperture 128 also defines a shoulder 134 that engages shoulder 120 of valve guide 68 to apply a linear force to valve guide 68 that urges valve guide 68 towards surface 122 of head 32. According to various alternative and exemplary embodiments, the connector may take any one of a variety of different configurations that enable it to retain the valve guide within the head in the appropriate position and in the appropriate manner.

Referring still to FIGS. 2 and 3, insert 70 (e.g., seal structure, valve seat, seal, gasket, etc.) is an element or member formed from a wear resistant material that is located in a position in which it forms a seating or contact surface that repeatedly engages, or is repeatedly engaged by, another element having a corresponding seating or contact surface. According to one exemplary embodiment, insert 70 is a ring-shaped member that is received within recess 111 in end 108 of valve guide 68. Insert 70 has a generally rectangular cross section and includes an inner surface 136, and outer surface 137, a valve face 138, and a guide face 139. When received within recess 111, outer surface 137 generally abuts axial surface 115 of recess 111, guide face 139 generally abuts radial surface 113 of recess, inner surface 136 has approximately the same diameter as second region 118 of aperture 110 of valve guide 68 and forms a portion of chamber 100, and valve face 138 faces head 94 of valve element 63. The diameter of inner surface 136 is smaller than the diameter of head 94 of valve element 63, while the diameter of outer surface 137 is larger than the diameter of region 76 of aperture 54 in head 32. This allows valve face 138 of insert 70 to engage both head 94 of valve element 63 and sealing surface 122 of head 32. Outer surface 137 is also longer than axial surface 115 of recess 111, therefore providing a portion of insert 70 that extends out of recess 111. This allows insert 70 to be held in place (at least in part) by being pinched or compressed between valve guide 68 (which is urged toward sealing surface 122 by the force applied to it by connector 69) and sealing surface 122 of head 32. As used herein, the terms "compress," "compressed," or "compression" should not be read to imply or require a change in shape or reduction in volume on the part of the member being compressed, although such a change in shape or reduction in volume may occur. The coupling of insert 70 within recess 111 of valve guide 68 forms a sealed interface between guide face 139 of insert 70 and radial surface 113 of recess 111 that is intended to prevent, or substantially prevent, the flow of fluid between valve guide 68 and insert 70. Because insert 70 is compressed between valve guide 68 and a portion of head 32, the sealed interface between guide face 139 of insert 70 and radial surface 113 of recess 111 remains engaged as valve element 63 moves between the open and closed positions. The coupling of insert 70 between valve guide 68 and sealing surface 122 of head 32 also forms a sealed interface between valve face 138 of insert 70 and sealing surface 122 of head 32 that is intended to prevent, or substantially prevent, the flow of fluid between insert 70 and sealing surface 122. When valve element 63 is moved into the closed position where insert 70 is compressed between head 94 and end 108 of valve guide 68, sealing surface 102 of head 94 is moved into contact with valve face 138 of insert 70 and creates a sealed interface that is intended to prevent, or substantially prevent, the flow of fluid between insert 70 and head 94 of valve element 63. When valve element 63 is moved into the open position, sealing surface 102 of head 94 is moved away from valve face 138 of insert 70, which then allows for the flow of fluid between insert 70 and head 94. Thus, the sealed interface between sealing surface 102 of head 94 and valve face 138 of insert 70 is engaged when valve element 63 is in the closed position and disengaged when valve element 63 is in the open position.

According to various alternative and exemplary embodiments, the insert may be made from any one or more of a variety of different materials that may be suitable for a particular application, and the materials may be provided in any number of different configurations. For example, the insert may be formed from a single material or it may be formed from a substrate over which an appropriate coating is applied. According to one exemplary embodiment, insert 70 may be intended for use with potentially corrosive fuels having low sulfur content and/or an average carbon chain lengths less than that of traditional 2D diesel fuels. Such fuels may include the ultra-low sulfur diesel fuel currently required in the U.S., JP8, K1, Toyu, Howell A, and other similar fuels, either alone or in conjunction with various fuel additives such as, for example, Caterpillar 2564968 fuel additive, methyl soyate (10-30% by volume), rapeseed methyl ester, reclaimed cooking oil, etc. In such an application and environment, insert 70 may be selected from one of a variety of different materials and take one of a variety of different configurations. For example, insert 70 may be made from a metal such as 440C stainless steel. Alternatively, insert 70 may be made from a metal substrate and coated with a material selected from various metal nitrides and diamond like carbons (DLC). For example, potentially suitable metal nitrides may include chromium nitride, zirconium nitride, molybdenum nitride, titanium-carbon-nitride, or zirconium-carbon-nitride, and suitable diamond-like carbon materials may include titanium containing diamond-like carbon (DLC), tungsten-DLC, or chromium-DLC. Alternatively, insert 70 may be made from a cermet, such as, for example, tungsten carbide in cobalt matrix, etc. Alternatively, insert 70 may be made from a ceramic, such as, for example, silicon carbide, zirconia, etc. Alternatively, insert 70 may be made from any one or more of the materials identified above. In any case, the appropriate material or materials from which the insert should be made will depend in large part on the application in which the control valve assembly will be used and on the characteristics of the fluid with which the control valve assembly will be used. Thus, an insert constructed from a certain material may be suitable for one application but not necessarily a different application.

According to various alternative and exemplary embodiments, instead of, or in addition to, being compressed between the valve guide and a portion of the head, the insert and valve guide may be configured so that the insert is retained within the recess in the valve guide through a press fit, an adhesive may be applied to the insert to help retain it with the recess, or other well know methods and/or components may be used to help retain the insert within the recess in the valve guide.

Figure 4:
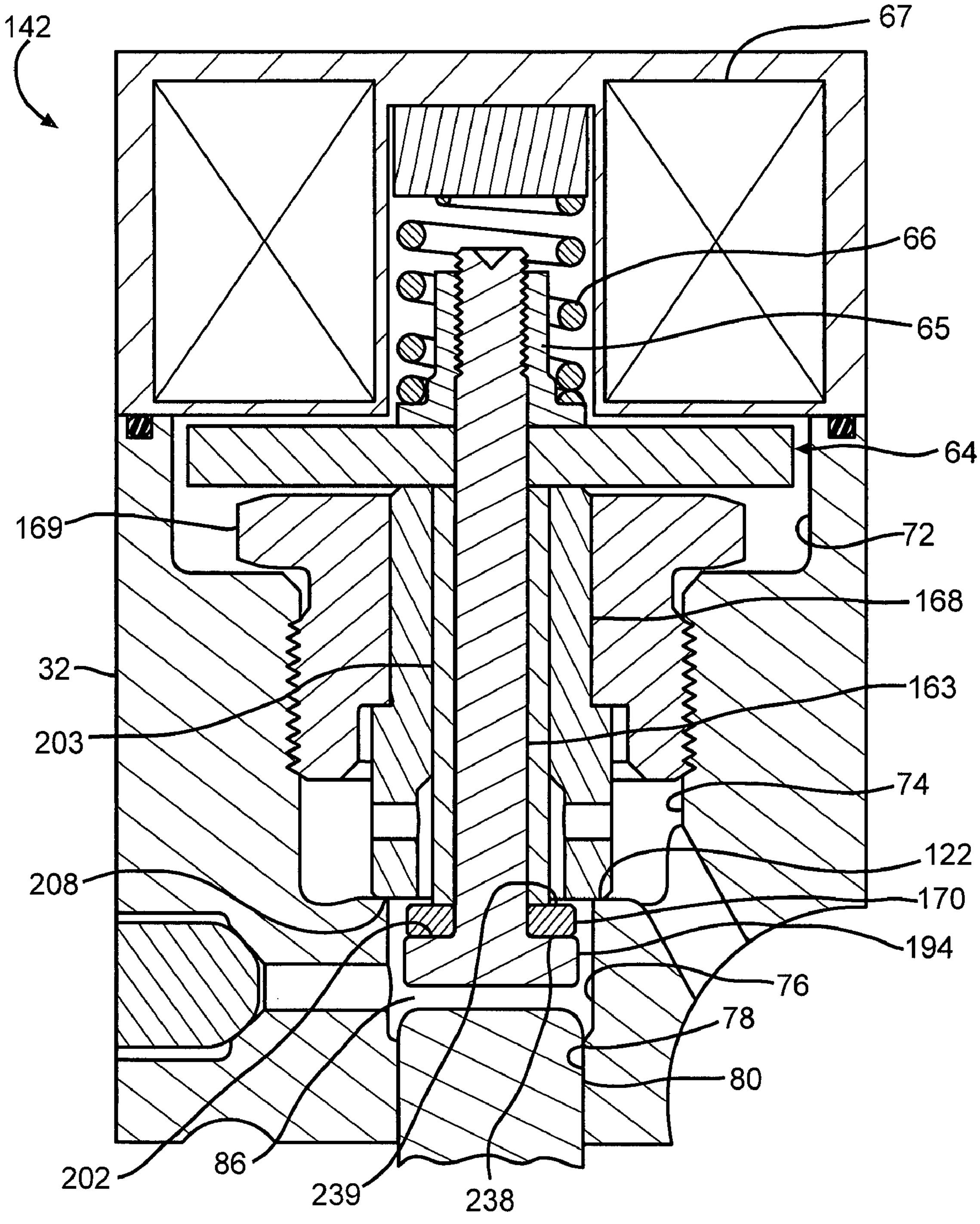
FIG. 4 is a cross-sectional side view of a control valve assembly according to another exemplary embodiment.

Referring now to FIG. 4, a second exemplary embodiment of the control valve assembly is shown. This second exemplary embodiment, control valve assembly 142, is substantially similar to control valve 42, the primary difference being that the insert is coupled to the valve element rather than the valve guide. Instead of remaining stationary when the valve element moves back and forth, as is the case with control valve assembly 42, the insert of control valve assembly 142 moves back and forth along with the valve element. Thus, with control valve 42, a moving head 94 seats against a stationary insert 70, whereas with control valve assembly 142, a moving insert seats against a stationary valve guide.

Control valve assembly 142 is arranged similarly to control valve assembly 42 and shares substantially similar components. To avoid unnecessary duplication, control valve assembly 142 will be described based primarily on how it differs from control valve assembly 42. Similar to control valve assembly 42, control valve assembly 142 includes a valve guide 168 having an end 208, a valve element 163, and an insert 170. However, unlike valve guide 68, end 208 of valve guide 168 does not include a recess configured to receive insert 170, which then engages sealing surface 122 of head 32. Instead, end 208 of valve guide 168 is configured to directly engage sealing surface 122 to create a sealed interface that is intended to prevent, or substantially prevent, the flow of fluid between them. Rather than being coupled to the valve guide, insert 170 is coupled to valve element 163. Valve element 163 is configured to receive insert 170 such that a valve face 238 of insert 170 abuts against a sealing surface 202 of a head 194 of valve element 163. In this configuration, the movement of valve element 163 between the closed position and the open position causes insert 170 to repeatedly contact (and form a sealed interface with) end 208 of valve guide 168. The coupling of insert 170 to valve element 163 forms a sealed interface between valve face 238 of insert 170 and sealing surface 202 on head 194 of valve element 163 that is intended to prevent, or substantially prevent, the flow of fluid between valve element 163 and insert 170. Because insert 170 is coupled to valve element 163, the sealed interface between valve face 238 of insert 170 and sealing surface 202 on head 194 of valve element 163 remains engaged as valve element 163 moves between the open and closed positions. When valve element 163 is moved into the closed position where insert 170 is compressed between head 194 and end 208 of valve guide 168, a guide face 239 of insert 170 is moved into contact with end 208 of valve guide 168 and creates a sealed interface that is intended to prevent, or substantially prevent, the flow of fluid between insert 170 and end 208 of valve guide 168. When valve element 163 is moved into the open position, guide face 239 of insert 170 is moved away from end 208 of valve guide 168, which then allows for the flow of fluid between insert 170 and end 208. Thus, the sealed interface between guide face 239 of insert 170 and end 208 of valve guide 168 is engaged when valve element 163 is in the closed position and disengaged when valve element 163 is in the open position.

To receive insert 170, valve element 163 is generally nail-shaped, having an elongated shaft of a first diameter and then a flange of a larger diameter forming head 194. Insert 170 slides over the elongated shaft until it abuts sealing surface 202 of head 194. A spacer or sleeve 203 may be provided that slides over the elongated shaft of valve element 163 and that extends between guide face 239 of insert 170 and the bottom of armature 64. Sleeve 203 is configured such that when sleeve 65 is coupled to an armature interface 190, sleeve 65 will sandwich or compress armature 64, sleeve 203 and insert 170 between the bottom of sleeve 65 and sealing surface 202 on head 194 of valve element 163. Thus, the presence of sleeve 203 will allow insert 170 to be retained in position by the threading of sleeve 65 onto armature interface 190. According to other various alternative and exemplary embodiments, valve element 163 and sleeve 203 may be configured so that sleeve 203 threads onto valve element 163 to hold insert 170 against head 194. According to other alternative and exemplary embodiments, insert 170 may be press fit onto valve element 163, may be directly threaded onto valve element 163, may be adhered to valve element 163 with an adhesive or epoxy, and/or may be coupled to valve element 163 in any other suitable manner.

According to various alternative and exemplary embodiments, the insert in either of the embodiments described above may take one of a variety of different configurations. For example, although the insert is illustrated as a ring having a generally rectangular cross-sectional shape, the cross-sectional shape of the insert may be square, trapezoidal, triangular, oval, circular, foot-ball shaped, or any other shape that is suitable for a particular application and the components with which the insert cooperates. According to other various alternative and exemplary embodiments, the insert may be coupled to a portion of head 32 or to another component of the control valve assembly, either in lieu of, or in addition to, coupling the insert to the valve element or valve guide. According to other various alternative and exemplary embodiments, the insert, valve guide, valve element, and/or pump head may be configured such that the insert is releasably coupled within the control valve assembly such that the insert may be removed from the control valve assembly and replaced with a new or different insert.

Although only one pump configuration was described above, it should be understood that the described pump is only one example of a pump in which the different embodiments of the control valve assembly may be used. For example, while only an inline plunger or piston pump was described above, the control valve assembly could also be used within any one of a variety of different piston or plunger pump configurations (e.g., axial piston pump, radial piston pump, bent axis pump, inlet metered pump, outlet metered pump, etc.) and with any one of a variety of different fluids (e.g., fuel, oil, hydraulic fluid, etc.). It also should be understood that while pump 18 was described above as including two cylinders or pumping chambers 86, and consequently, two corresponding tappet assemblies 36, resilient members 40, control valve assemblies 42, and plunger assemblies 43, the pump could also be configured to include one, three, four, or more than four pumping chambers, depending on the particular application in which the pump is intended to be used.

Although only two different control valve assembly configurations were described above, it should be understood that the described control valve assembly configurations are only two examples of the many different valve configurations or systems in which the insert may be used or incorporated. For example, the insert may also be incorporated into the control valve assembly of a fuel injector, such as a common rail fuel injector. The insert may also be incorporated into a check valve or into other types of valves that have a seat and a moving element that repeatedly contacts the seat.

INDUSTRIAL APPLICABILITY

Pump 18 operates to pressurize a fluid (e.g., fuel) by drawing the fluid into one or more pumping chambers 86, reducing the size of pumping chambers 86, and then forcing the fluid through an outlet to common rail 20. The way in which pump 18 operates will now be more specifically described in connection with one of pumping chambers 86. Starting from the beginning of the pumping cycle, plunger 80 is at bottom dead center and pumping chamber 86, which is normally full of fuel at this point, is at its maximum volume. As the peak of one of cam lobes 56 rotates to a position under tappet assembly 36, the cam lobe 56 forces tappet assembly 36, and therefore plunger assembly 43, upward. As plunger assembly 43 moves upward (according to the shape or contour of cam lobe 56), plunger 80 moves upward within region 78 of aperture 54 in head 32 thereby reducing the volume of pumping chamber 86. Generally, at about the same time plunger 80 begins to move upward, solenoid 67 is energized, which has the effect of moving valve element 63 into the closed position where the pumping chamber 86 is closed off from fuel inlet passage 84. The pressure within pumping chamber 86 also helps to urge valve element 63 into the closed position. As a result of the pressure within pumping chamber 86, solenoid 67 may be deenergized during the pumping cycle without valve element 63 moving into the open position. As plunger 80 continues to move upward, the volume of pumping chamber 86 continues to reduce, which forces fuel out of pumping chamber 86 through a fuel outlet passage 85 and eventually to common rail 20. The pumping cycle continues until plunger 80 reaches top dead center, which occurs when the peak of cam lobe 56 is below tappet assembly 36. Generally, after plunger 80 reaches top dead center and begins the filling cycle, solenoid 67 is deenergized (if it wasn't already deenergized during the pumping cycle) and the pressure drops enough to allow valve element 63 to move, pursuant to the bias provided by spring 66, to the open position where fuel from fuel inlet passage 84 is again permitted to enter pumping chamber 86. As the peak of cam lobe 56 rotates past tappet assembly 36, the bias provided by resilient element 40 urges plunger assembly 43 and tappet assembly 36 back down toward camshaft 34. At this point, the backside of cam lobe 56 is below tappet assembly 36, which allows it to move back down. As plunger 80 moves downward within aperture 54 during the filling cycle, fuel continues to fill pumping chamber 86. When plunger 80 reaches bottom dead center, pumping chamber 86 will normally be full of fuel and at its maximum volume. The cycle then starts over again, with the cam lobe 56 urging tappet assembly 36 and plunger assembly 43 back up toward top dead center.

Control valve assembly 42 may be activated and deactivated at different times during the pumping and filling cycles to control how much fuel enters pumping chamber 86 during the filling cycle and/or to control whether pumping chamber 86 is coupled to fuel inlet passage 84 (which is part of a fluid circuit that flows back to transfer pump 16 and therefore acts as a drain) during all or a portion of the pumping cycle. In this way, the output of the pump may be controlled.

Depending on the configuration of the control valve assembly that is being used, each time the valve element is moved into the closed position, sealing surface 102 on head 94 of valve element 63 will make contact with or impact valve face 139 of insert 70 (with respect to control valve assembly 42), or guide face 239 of insert 170 will make contact with or impact end 208 of valve guide 168 (with respect to control valve assembly 142). The contact of sealing surface 102 with valve face 139 of insert 70, in case of control valve assembly 42, or the contact of guide face 239 of insert 170 with end 208 of valve guide 168, in the case of control valve assembly 142, is what creates a sealed interface that substantially prevents fluid communication between pumping chamber 86 and fuel inlet passage 84.

Over the life of a pump similar to the one described above, the valve element will likely move between the open and closed positions millions of times. This means that a portion of the valve element will repeatedly make contact with or impact a corresponding sealing surface to create a temporary seal. The large number of contact or impact events combined with the lower lubricity of the newer blends of diesel fuel (e.g., U.S. ultra low sulfur diesel fuel, Toyu, JP8, etc.) makes avoiding excessive wear at or around the sealing surface or valve seats an increasingly difficult task.

Control valve assemblies 42 and 142 represent a reliable, low cost, and durable way to minimize the effects of wear at or around those sealing interfaces or valve seats that are repeatedly opened and closed. First, the use of insert 70 or 170 allows for the relatively isolated use of a material and/or coating strategy at or around the valve seat or sealing interface that, while suited for use at or around the valve seat, may not necessarily be suited for other components of control valve assembly 42, 142 or head 32. Second, the relatively small amount of material and/or coating used to form insert 70, 170 makes it possible to utilize relatively expensive materials for insert 70, 170 without adding much overall cost to control valve assembly 42, 142 or pump 18. Third, the manner in which insert 70, 170 is incorporated into control valve assembly 42, 142 (e.g., in general, between valve guide 68, 168 and a portion of valve element 63, 163) creates a situation where the stresses to which insert 70, 170 is exposed are primarily compressive forces. Consequently, brittle materials (e.g., ceramics, etc.) that generally are not capable of withstanding significant tensile stresses may be used in the construction of insert 70, 170. Thus, the manner in which insert 70, 170 is incorporated into control valve assembly 42, 142 creates a situation that permits the use of one or more of a wide range of materials. This helps to make the selection of an appropriate material, such as a material that is resistant to wear in the presence of low lubricity fuels and to the corrosive nature of such fuels, an easier task. Fourth, the relatively simple design of insert 70, 170 does not require the use of complex machining. Thus, constructing insert 70, 170 from materials that are difficult to machine (e.g., very hard and/or brittle materials) is not foreclosed because, in many cases, only a minimal amount of relatively simple machining will be required. Fifth, the use of insert 70, 170, which may be designed to be easily removed from control valve assembly 42, 142 and replaced with a different insert, may allow a single control valve assembly 42, 142 and/or pump 18 to be adapted to different working environments, such as an environment where the control valve assembly or pump will be exposed to a fuel or to another fluid having different characteristics. Thus, a pump originally configured for use with a certain fluid may be modified to work with a fluid having different properties by replacing the original inserts 70, 170 of the pump with different inserts 70, 170, that are suited for use with the new fluid. Similarly, the use of insert 70, 170 may make it possible to utilize a common control valve assembly configuration and common control valve assembly parts across different pump lines, except for insert 70, 170, which may be selected based on the particular application in which a pump line will be used.

It is important to note that the construction and arrangement of the elements of the control valve assembly as shown in the exemplary and other alternative embodiments is illustrative only. Although only a few embodiments of the control valve assembly have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited. For example, elements shown as integrally formed may be constructed of multiple parts or elements shown as multiple parts may be integrally formed, the operation of the interfaces (e.g., the interfaces between the valve guide, insert, valve element, head, etc.) may be reversed or otherwise varied, and/or the length or width of the structures and/or members or connectors or other elements of the assembly or system may be varied. It should be noted that the elements and/or assemblies of the control valve assembly may be constructed from any of a wide variety of materials that provide sufficient strength, durability, and other relevant characteristics, from any of a wide variety of different manufacturing processes, and in any of a wide variety of colors, textures, combinations, and configurations. It should also be noted that the control valve assembly may be used in association with various types of pumps, including a variety of different piston pumps, with a variety of different mechanisms in a variety of different applications (e.g., various mechanisms in engines, such as intake or exhaust valve actuation systems, fuel injectors, fuel transfer pumps, check valves, other various valves, etc.), and with a variety of different fluids (e.g., fuel, oil, hydraulic fluid, transmission fluid, water, coolant, etc.) Accordingly, all such modifications are intended to be included within the scope of the present disclosure. Other substitutions, modifications, changes and omissions may be made in the design, operating conditions and arrangement of the exemplary and other alternative embodiments without departing from the spirit of the present disclosure.

What is claimed is:

1. A valve assembly received within an aperture of a high-pressure pump, wherein the aperture defines a pump aperture sealing surface, and wherein the high-pressure pump includes a fuel inlet passage and a fuel outlet passage, the valve assembly comprising:

an actuator actuatable in response to an input signal;

a valve element moveable between an open position and a closed position, the valve element including a body and a head, the head including a valve element sealing surface;

a valve guide including a first end and a second end, a valve guide aperture having a first region proximate the first end and a second region proximate the second end, and a flow passage between the second region of the valve guide aperture and an external surface of the valve guide proximate the second end, the first region of the valve guide aperture closely receiving the body of the valve element to minimize fluid leakage from the first region, the second end including a recess defined by a radial surface and an axial surface, and the flow passage being configured to allow fluid to flow through the valve guide;

an insert disposed within the recess at the second end of the valve guide and including a valve face, a guide face and an inner surface defining an opening through the insert; and a connector including an aperture extending longitudinally through the connector and receiving the valve guide and valve element therein, and an external surface engaged by a portion of a surface defining the aperture of the high pressure pump to align the valve guide and valve element within the aperture of the high pressure pump such that the valve face engages the pump aperture sealing surface to form a first sealed interface, the guide face engages the radial surface of the valve guide to form a second sealed interface, and wherein the flow passage, the second region of the valve guide aperture and the opening of the insert defined by the inner surface define a flow chamber placing the fuel inlet passage in fluid communication with the fuel outlet passage;

wherein the actuation of the actuator causes the valve element to move from the open position in which the valve element sealing surface is disengaged from the valve face to allow fluid flow from the fuel inlet passage through the flow chamber to the fuel outlet passage to the closed position in which the valve element sealing surface engages the valve face to prevent fluid flow through the flow chamber to the fuel outlet passage.

2. The valve assembly of claim 1, wherein the insert is made from a different material than at least one of the valve element and the valve guide.

3. The valve assembly of claim 1, wherein the insert is made from at least one of stainless steel, cermet, and ceramic.

4. The valve assembly of claim 3, wherein the insert is made from at least one of 440C stainless steel, tungsten carbide in a cobalt matrix, silicon carbide, and zirconia.

5. The valve assembly of claim 1, wherein the insert includes a substrate and a coating applied to the substrate.

6. The valve assembly of claim 5, wherein the coating is at least one of a metal nitride or a diamond like carbon.

7. The valve assembly of claim 6, wherein the coating is at least one of chromium nitride, zirconium nitride, molybdenum nitride, titanium-carbon-nitride, or zirconium-carbon-nitride.

8. The valve assembly of claim 6, wherein the coating is at least one of titanium containing diamond like carbon, chromium containing diamond like carbon, and tungsten containing diamond like carbon.

9. The valve assembly of claim 1, wherein the valve element includes a stem located between the body and the head.

10. The valve assembly of claim 9, wherein the stem has a diameter less than that of the body and the head.

11. The valve assembly of claim 1, wherein the valve face and the radial surface are substantially parallel to one another.

12. The valve assembly of claim 1, wherein the valve element, the valve guide, the connector and the insert are configured so that the head of the valve element moves away from the second end of the valve guide when the valve element moves from the closed position to the open position and so that the head of the valve element moves towards the second end of the valve guide when the valve element moves from the open position to the closed position.

13. A pump comprising:

a moveable driven member powered by an external power source;

a housing receiving the driven member;

a head coupled to the housing, the head including an aperture and a fuel inlet passage;

a plunger assembly coupled to the driven member and including a plunger configured to reciprocate within the aperture in response to the movement of the driven member, the plunger and the aperture of the head at least partially defining a pumping chamber; and a control valve assembly received in the aperture of the head, wherein the aperture of the head defines a pump aperture sealing surface, the control valve assembly comprising:

an actuator actuatable in response to an input signal;

a valve element moveable between an open position and a closed position, the valve element including a body and a head, the head including a valve element sealing surface;

a valve guide including a first end and a second end, a guide aperture having a first region proximate the first end and a second region proximate the second end, and a flow passage between the second region of the valve guide aperture and an external surface of the valve guide proximate the second end, the first region of the valve guide aperture closely receiving the body of the valve element to minimize fluid leakage from the first region, the second end including a recess defined by a radial surface and an axial surface, and the flow passage being configured to allow fluid to flow through the valve guide;

an insert disposed within the recess at the second end of the valve guide and including a valve face, a guide face and an inner surface defining an opening through the recess; and a connector including an aperture extending longitudinally through the connector and receiving the valve guide and valve element therein, and an external surface engaged by a portion of a surface defining the aperture of the head to align the valve guide and valve element with the aperture of the head such that the valve face engages the pump aperture sealing surface to form a first sealed interface, the guide face engages the radial surface of the valve guide to form a second sealed interface, and wherein the flow passage, the second region of the valve guide aperture and the opening of the insert defined by the inner surface define a flow chamber placing the fuel inlet passage in fluid communication with the pumping chamber;

wherein the actuation of the actuator causes the valve element to move from an open position in which the valve element sealing surface is disengaged from the valve face and the pumping chamber is fluidly connected with the fuel inlet to a closed position in which the valve element sealing surface engages the valve face and the pumping chamber is fluidly disconnected with the fuel inlet passage; and wherein the actuator is selectively actuatable to control the fluid communication between the fuel inlet passage and the pumping chamber.

14. The pump of claim 13, wherein the insert is made from at least one of stainless steel, cermet, and ceramic.

15. The pump of claim 13, wherein the insert includes a substrate and a coating applied to the substrate.

16. The pump of claim 13, wherein the valve element, the valve guide, the connector and the insert are configured so that the head of the valve element moves away from the second end of the valve guide when the valve element moves from the closed position to the open position and so that the head of the valve element moves towards the second end of the valve guide when the valve element moves from the open position to the closed position.

* * * * *